United States Patent [19]

Taller et al.

[11] 4,045,474

[45] Aug. 30, 1977

[54] LOW VISCOSITY POLY(EPOXIDE-CAPROLACTONE) POLYOLS

[75] Inventors: Robert Arthur Taller, Charleston; Decker Kuykendall Elder, S. Charleston, both of W. Va.

[73] Assignee: Union Carbide Corporation, New York, N.Y.

[21] Appl. No.: 620,399

[22] Filed: Oct. 7, 1975

[51] Int. Cl.$^2$ .............................................. C08G 63/06
[52] U.S. Cl. ...................... 260/484 A; 260/77.5 AP; 260/78.3 R; 428/423
[58] Field of Search ...................... 260/78.3 R, 484 A

[56] References Cited

U.S. PATENT DOCUMENTS

| | | | |
|---|---|---|---|
| 2,750,395 | 6/1956 | Phillips et al. | 260/348 |
| 2,890,194 | 6/1959 | Phillips et al. | 260/45.4 |
| 3,169,945 | 2/1965 | Hostettler et al. | 260/78.3 |
| 3,699,070 | 10/1972 | Wynstra et al. | 260/31.4 EP |
| 3,896,303 | 7/1975 | Gerkin et al. | 260/78.3 R |

*Primary Examiner*—Harold D. Anderson
*Assistant Examiner*—E. A. Nielsen
*Attorney, Agent, or Firm*—Francis M. Fazio

[57] ABSTRACT

High functionality polyol compositions that have a low viscosity of less than 5,000 cks. at 130° F. and an equivalent weight of at least 150 are useful for the formation of high performance coatings. These are produced by reacting a mixture of at least two polycaprolactone polyols having a hydroxyl number from about 180 to about 600 and a diepoxide.

6 Claims, No Drawings

LOW VISCOSITY POLY(EPOXIDE-CAPROLACTONE) POLYOLS

BACKGROUND OF THE INVENTION

It is known that caprolactone polyols are suitably employed in forming urethane coatings and that they offer a number of advantages over conventional polyester polyols. One of these advantages is that reaction of caprolactone polyols with polyisocyanates generally provides urethane coatings having better weathering characteristics. Clear coatings for exterior application are obtained from caprolactone polyols and aromatic polyisocyanates such as tolyene diisocyanates but such coatings tend to yellow due to the know light instability associated with aromatic diisocyanates.

It is also known that light stable urethane coatings are provided by reaction of caprolactone polyols with aliphatic diisocyanates.

It is disclosed in U.S. Pat. No. 3,896,303 to Gerkin and Comstock that adducts of polyepoxides and polycaprolactone polyols having functional hydroxyl groups, produced by reacting polycaprolactone polyols and polyepoxides, can be reacted with aliphatic polyisocyanates to produce polyurethane coatings useful in high performance applications. Such coatings exhibit the characteristics of high hardness, good impact resistance, low temperature flexibility, and chemical resistance. One of the disadvantages associated with the products obtained in this patent is their high viscosities, which present problems in their manufacture and use. This necessitates the addition of solvents, resulting in a lower total solids content. Consequently, cure requires more energy and the voltilization of the solvents causes atmosphereic pollution.

It is an object of this invention to provide certain improved low viscosity polycaprolactone-based polyols which are especially useful in the formation of high performance coatings. These products have higher equivalent weight and substantially lower viscosity than the compositions disclosed in the prior art.

Another object is to provide polycaprolactone-based polyols which are used with particular advantage in forming light stable polyurethane coatings having a good balance of hardness, flexibility and abrasion resistance as well as weatherability, chemical resistance and high total solids content.

Various other objects and advantages of this invention will become apparent to those skilled in the art from the accompanying description and disclosure.

SUMMARY OF THE INVENTION

It has now been discovered that low viscosity, high functionality adducts of polycaprolactone polyols and polyepoxides useful in producing urethane coatings can be produced by reacting a diepoxide with an excess of a mixture of certain polycaprolactone polyols. Particularly desirable properties are obtained when the ratio of the mixture of polycaprolactone polyols to diepoxide is from about 2.5:1 to about 4:1. Under these conditions the adducts of polycaprolactone polyols and diepoxides produced have low viscosities of less than 5,000 cks. at 130° F. which were heretofore unobtainablve. By using a mixture of polycaprolactone polyols having different hydroxyl numbers, as hereinafter described, these low viscosities can be obtained in combination with equivalent weights above 150.

DESCRIPTION OF THE INVENTION

Production of the adducts of polycaprolactone polyols and diepoxides of the present invention involves the reaction of a mixture of at least two polycaprolactone polyols with a diepoxide in critical ratios. The polycaprolactone polyols which may be used in this reaction and their means of preparation are known in the art and are described in U.S. Pat. No. 3,169,945 to Hostettler and Young. They are produced by the polymerization of epsilon-caprolactone in the presence of a polyhydric initiator.

The preferred polycaprolactone polyols are the trifunctional compounds having hydroxyl numbers of from about 180 to about 600 and average molecular weights of from about 300 to 1,000. Illustrative of suitable polycaprolactone polyols one can mention the reaction product obtained by reacting epsilon caprolactone and trimethylolpropane to an average molecular weight of from 300 to 1,000; other suitable initiators can be used such as glycerol, 1,2,4-butanetriol, 1,2,6-hexanetriol, pentaerythritol, dipentaerythritol, the oxyethylated or oxypropylated adducts of such compounds, such as, for example, the ethylene oxide adducts of trimethylolpropane, and mixtures of any of the aforesaid initiators. One can also use a difunctional initiator such as ethylene glycol, propylene glycol, diethylene glycol, dipropylene glycol, the butanediols, the hexanediols and the like. Any of the known polycaprolactone polyols having the above hydroxyl numbers and molecular weights can be used.

The diepoxides which are reacted with the abovedescribed polycaprolactone polyols to produce the novel adducts of the present invention comprise organic molecules free of non-benzoid unsaturation which contain oxirane groups. The carbon atoms of the oxirane group may or may not be part of a saturated cyclic ring. The oxirane group may be present as an end capping unit of the molecule or it may be contained on internal carbon atoms. Generally, no atoms other than carbon, hydrogen and oxygen are present with the exception that aromatic rings, when present in the compound, may be brominated or chlorinated.

It is preferred to employ cycloaliphatic diepoxides. From a standpoint of providing polyols useful in producing high solids urethane coatings with good hardness and weatherability, particularly preferred compounds are those having the general formula:

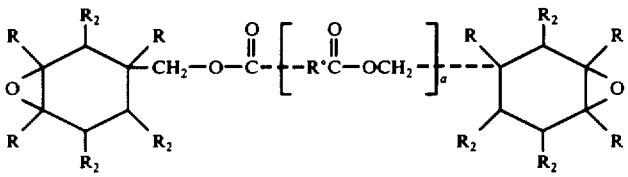

where R is hydrogen or an alkyl group having from 1 to 4 carbon atoms, R° is a valence bond or a hydrocarbon radical having from 1 to 5 carbon atoms and $a$ is zero or one. It is to be understood that the R groups may be the same as or different from each other. It is preferred that R be hydrogen or methyl and that no more than two of the R groups bonded to a ring be methyl.

Diepoxides such as those described in the formula above are known in the art. Specific examples of such compounds are described in U.S. Pat. Nos. 2,890,194 and 2,750,395 both issued to B. Phillips et al. Illustrative thereof one can mention 3,4-epoxycyclohexylmethyl-3,4-epoxycyclohexanecarboxylate, 3,4-epoxy-1-methylcyclohexylmethyl-3,4-epoxy-1-methlcyclohexanecarboxylate, 3,4-epoxy-6-methylcyclohexylmethyl-3,4-epoxy-6-methylcyclohexanecarboxylate, 3,4-epoxy-3-methylcyclohexylmethyl-3,4-epoxy-3-methylcyclohexanecarboxylate, bis(3,4-epoxycyclohexylmethyl)oxalate, bis(3,4-epoxy-6-methylcyclohexylmethyl)succinate, bis(3,4-epoxycyclohexylmethyl)adipate and bis(3,4-epoxy-6-methylcyclohexylmethyl)adipate. Also one can mention as suitable 2,2-bis(3,4-epoxycyclohexyl)propane and bis(2,3-epoxycyclopentyl)ether.

When a single polycaprolactone polyol as described above is reacted with a diepoxide as described above in a polycaprolactone polyol to diepoxide ratio of from 2.5:1 to 4:1 an adduct is obtained which has a desirably low viscosity. However, the equivalent weight of the adduct is undesirably low. Consequently, a larger proportion of higher cost isocyanate is required to produce a polyurethane coating. In some instances, higher isocyanate content can result in inferior weathering characteristics. The present invention employs a mixture of polycaprolactone polyols with hydroxyl numbers such that the difference between the hydroxyl numbers is from about 250 to 400, preferably from 250 and 350, the molecular weights of the polycaprolactone polyols being from 300 to 1,000. The mole ratio of polycaprolactone polyols to diepoxides is from 2.5:1 to 4:1. The adducts thus obtained have low viscosities of less than 5,000 cks. at 130° F. and equivalent weights above 150; polyurethane coating compositions produced therefrom have a good balance of physical properties. Such low viscosity, high equivalent weight adducts have not heretofore been disclosed and it was an unexpected and unobvious finding that they could be obtained when a mixture of at least two polycaprolactone polyols having different hydroxyl numbers was reacted with a diepoxide. Polyurethane coatings produced by reacting these adducts with a polyisocyanate have a combination of high hardness, flexibility and abrasion resistance. Particularly desirable properties are obtained when a polycaprolactone polyol having a hydroxyl number of not more than 310 and a polycaprolactone polyol having a hydroxyl number of not less than 560 are employed. The mixture of polycaprolactone polyols may be used in any combination such that the ratio of the sum of the moles of the polycaprolactone polyols used to the number of moles of diepoxide used is from 2.5:1 to 4:1.

Illustratively, a polycaprolactone triol having a hydroxyl number of 560, a polycaprolactone triol having a hydroxyl number of 310 and a cycloaliphatic diepoxide can be reacted in a mole ratio of 2:2:1, respectively, to yield an adduct of polycaprolactone polyols and diepoxide having an equivalent weight of about 163. This adduct, when combined with a polyisocyanate, will form a polyurethane coating exhibiting high hardness, flexibility, abrasion resistance and good weatherability. The low viscosity of such a coating—about 1,013 cks. at 130° F.—allows the use of less solvent when formulating a polyurethane coating. Consequently, high solids content in the final coating can be achieved.

One can also vary the mole ratios from 2:2:1 specified above to 2:1.5:1, or 2:1:1, or 3:1:1, or 1:3:1, or 2.5:1:1, or 1.5:2:1, or 1.5:1:1 or any other possible combination in which the sum of the moles of polycaprolactone polyols is from 2.5 to 4 per mole of diepoxide.

When compared with an adduct produced by reacting 2 moles of a polycaprolactone polyol having a hydroxyl number of 560 with 1 mole of 3,4-epoxycylohexylmethyl-3,4-epoxycylohexanecarboxylate, which has an equivalent weight of 140 and a viscosity of 22,000 cks. at 130° F., the lower viscosities and higher equivalent weights of the adducts of this invention are clearly evident. Similar results were observed when the adducts of the present invention were compared to those obtained by reacting 2.5 or 3 moles of a single polycaprolactone polyol having a hydroxyl number of 560 and 3,4-epoxycyclohexylmethyl-3,4-epoxycyclohexanecarboxylagte. In the latter instances viscosities were from about 8,000 cks. to about 10,000 cks. at 130° F. and the equivalent weights were from about 125 to about 135. It can be seen that when using a single polycaprolactone polyol one does not obtain the desired low viscosity and high equivalent weight.

The adducts of this invention are prepared by reacting the polycaprolactone polyols and diepoxides at a temperature from about 212° F. to 374° F., preferably between about 296° F. and 347° F. and most preferably at about 302° F. The reaction proceeds satisfactorily at substantially atmospheric pressure under an inert atmosphere. However, elevated pressures may be used.

The reaction is preferably carried out in the presence of a catalyst. Metal catalysts, particularly organic derivatives of tin including stannous and stannic compounds are especially suitable. Illustrative of this type of catalyst are the following, which may be employed individually or in combination: stannous salts of carboxylic acids such as stannous octoate, stannous oleate, stannous acetate and stannous laurate; dialkyltin dicarboxylates such as dibutyltin dilaurate, dibutyltin diacetate, dibutyltin di(2-ethylhexanoate) and others such as, for example, di-n-octyl tin mercaptide, and the like. The catalyst is used in an amount usually between about 0.001 and about 0.1 weight percent of the combined total weight of the polycaprolactone polyols and diepoxide reactants.

It is believed that during the reaction of the mixture of polycaprolactone polyols and diepoxide at least a major portion of the polycaprolactone groups are monofunctional when reacted with the diepoxide such that the equivalent of one hydroxyl group of the polyol reacts with a single epoxy group to open the oxirane ring to form a hydroxyl group on one of the oxirane carbon atoms, and an ether linkage with the second oxirane carbon atom and a carbon atom of the polyol. The following equation illustrates the reaction of two moles of a polycaprolactone triol with one mole of a cyclohexene diepoxide:

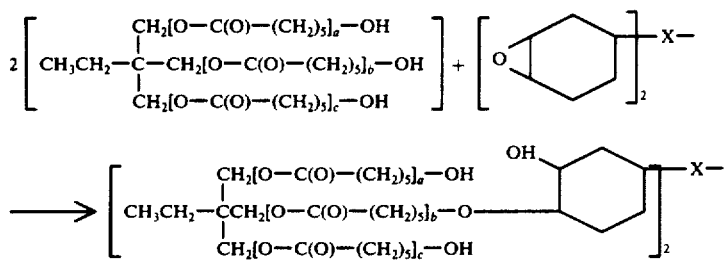

In the above equation, X is any of the bivalent groups that links the two 3,4-epoxycyclohexyl nuclei such as —CH₂OOC—, —CH₂OOCRCOOCH₂— or —C(CH₃)₂—. The values of a, b and c may be any integers, including zero, such that the average molecular weight of the polycaprolactone polyol reactant shown is from about 300 to 1,000. It is to be understood that the structure of the product shown in the above equation is illustrative only and that any of the three hydroxyl groups of the caprolactone triol may react to open the oxirane groups of the diepoxide reactant.

The above equation represents a theoretical norm. However, additional species of longer chain length can be present in the reaction product as a result of reactions of the hydroxyl groups of the product shown with unreacted oxirane groups during the initial phase of the reaction. Moreover, additional reaction mechanisms, such as the reaction of hydroxyl groups of unreacted polycaprolactone polyols with the ester linkage of the diepoxide, may account for other long chain components in the reaction product. The presence of these long chain components can result in an increase in product viscosity.

With an excess of polycaprolactone polyol above that needed for a stoichiometrically complete reaction with the diepoxide in the reaction mixture, shorther chain length products such as those illustrated in the above equation are favored. This is believed to be due to the greater availability of hydroxyl functional groups in the polyols to react with the oxirane groups in the initial phase of the reaction.

The novel adducts of the present invention are useful in the production of polyurethane compositions, particularly high solids coatings having high hardness, flexibility, abrasion resistance and good weatherability. To produce such coatings, the novel adducts are reacted with polyisocyanates containing reactive isocyanato groups.

Polyisocyanates suitable for reacting with the adducts of the present invention are any of those which are well know in the art of polyurethane chemistry, including aliphatic, cycloaliphatic, araliphatic and aromatic polyisocyanates and biuret-containing polyisocyanates. To produce light-stable coatings, the aliphatic polyisocyanates are preferred.

The polyisocyanates used are so well known in the art that they do not need any further description to enable one skilled in the art to know what they are.

The polyisocyanate and the novel adducts of this invention are reacted in proportions sufficient to allow reaction of all the hydroxyl groups with an isocyanato group. Those skilled in the art are fully aware that generally a slight excess of isocyanato groups is employed.

Normally, both the adduct and the polyisocyanate are in a liquid state. Solvents well known in the art may be used with the isocyanate if desired, but such solvents have the effect of reducing the solids content of the coating.

Usually, the adduct and polyisocyanate are kept separate until a short period prior to the time of application of the coating to the substrate. The two components are then mixed and applied to the substrate. Any application technique known to the art such as spraying, brushing or rolling onto the substrate may be employed.

Conventional additives, such as pigments, colorants, leveling agents and dispersing agents may be present in the usual known concentrations.

Normally, coatings produced from the adducts of the present invention cure at room temperture, but heating at temperatures up to about 302° F. may be used to accelerate curing and facilitate solvent removal. Preferred temperatures are between room temperature and 200° F.

The polyurethane coatings produced by the novel adducts of polycaprolactone polyols and diepoxides described herein are suitable for application to metal, wood, plastic, fabric and leather substrates, although this list is not intended to be exclusive.

The examples that follow are meant to be illustrative only and not to limit the invention.

For the sake of brevity in the Examples that follow, the designations indicated in column 1 of Table I will be used in lieu of the complete description given in the second column.

TABLE I

| Designation | Composition |
|---|---|
| Polyol A | A polycaprolactone triol having a Hydroxyl No. of 560 and an average molecular weight of 300 (equivalent weight = 100). It is prepared by the reaction of trimethylolpropane as initiator with epsilon caprolactone monomer in the presence of stannous octoate catalyst (0.002 weight percent, based on weight of total charge), at a temperature of approximately 374° F. and a mole ratio of monomer to initiator of about 1.45:1. |
| Polyol B | A polycaprolactone triol having a Hydroxyl No. of 310 and an average |

TABLE I-continued

| Designation | Composition |
|---|---|
| | molecular weight of 540 (equivalent weight = 180). It is prepared by the reaction of trimethylolpropane with 3.6 moles of epsilon-caprolactone. |
| Polyepoxide A | 3,4-Epoxycyclohexylmethyl-3,4-epoxy-cyclohexanecarboxylate. |
| Polyol C | A polycaprolactone polyol which is prepared by the reaction of Polyol A and Polyepoxide A above in a mole ratio of 2:1 respectively. |
| Polyisocyanate A | A biuret of 1,6-hexamethylene diisocyanate having a free-NCO content of about 17.12 weight percent and an equivalent weight of about 245.3. |
| Leveling Agent A | $(CH_3)_3SiO\text{---}\left[\underset{CH_3}{\overset{CH_3}{SiO}}\right]_7\text{---}\left[\underset{C_3H_6\text{---}(OC_3H_6)_{12}OC_4H_9}{\overset{CH_3}{SiO}}\text{---}CH_3\right]$ |

Except where indicated otherwise in the following Examples, Table II indicates the standard procedures or instruments used to determine the physical and chemical properties of the polyols and coatings in the examples.

TABLE II

| Property | Test Procedure |
|---|---|
| Viscosity | Cannon-Fenske capillary type viscometer |
| Hardness, Sward | Sward hardness tester |
| Hardness, Pencil | The "leads" of pencils containing "lead" of different hardnesses are ground flat, perpendicular to the axis. The coating is then scratched with the edge of the "lead." The hardest pencil (e.g. H, 2H) which does not penetrate the coating is designated as the pencil hardness of the coating. |
| Abrasion Resistance | Taber abrasion (1000 gram weight, 1000 cycles CS-10 wheel); indicates weight (mg.) lost during test. |
| Impact | Gardner impact tester |
| 20° Gloss | Gardner glossmeter (scale of 0° to 100°, 100° = mirror finish) |
| Hydroxyl No. | Number of milligrams of KOH required to completely neutralize the hydrolysis product of the fully acetylated derivative prepared from one gram of the polyol. |

CONTROL ADDUCTS

A series of reactions was carried out to produce adducts using a single polycaprolactone polyol and a diepoxide for comparison with the novel adducts of Examples 1 and 2, which used mixtures of polycaprolactone polyols. In runs numbered through 4 the reactants were charged to a 5-liter kettle that was equipped with a stirrer, thermocouple and inlet tube for nitrogen. The amounts charged were 3,256 g. of Polyol A and 744 g. of Polyepoxide A (a polyol to epoxide ratio of 4:1). The temperature of the mixture was raised to 100° C. and stannous octoate was added in the amount shown in the table below. After catalyst addition, the temperature was increased to 150° C. and maintained at 150°–1550° C. Periodically samples were removed and analyzed for unreacted oxirane. When analysis indicated an unreacted oxirane content below 0.55 weight percent, the reaction was stopped. The physical properties of the adducts obtained are given in the table below. In run number 5 an adduct was prepared in which the mole ratio of Polyol A to Polyepoxide A was 2:1, using essentially the same reaction conditions as runs 1 to 4.

| Run No. | 1 | 2 | 3 | 4* | 5 |
|---|---|---|---|---|---|
| Catalyst, ppm | 14 | 30 | 150 | 170 | 148 |
| Equivalent wt. | 121 | 120 | 121 | 124 | 141 |
| Water, % by wt. | 0.06 | 0.03 | 0.02 | 0.03 | — |
| Oxirane, % by wt. | 0.44 | 0.30 | 0.06 | 0.03 | 0.51 |
| Color, Gardner | 2.5 | — | 1.5 | 2.0 | 1.0 |
| Viscosity, at 130° F. | 1,736 | 1,750 | 1,949 | 2,893 | 21,850 |

*In this run the catalyst was added in two equal portions, the first at 100° C. and the second portion after the temperature reached 150° C.

EXAMPLE 1

A 5-liter kettle that was equipped with a thermometer, stirrer and nitrogen inlet tube was charged with 1,200 g. of Polyol A, 2,172 g. of Polyol B and 548 g. of Polyepoxide A (a mole ratio of 2:2:1, respectively). The temperature of the reaction mass was raised to 100° C. and 0.723 g. (185 ppm) of stannous octoate catalyst was added. The temperature was increased to 150° C. and the reaction was allowed to proceed until the unreacted oxirane in the kettle was 0.31 weight percent. The adduct of the polycaprolactone triols and diepoxide was a yellow liquid having a hydroxyl number of 345, a water content of 0.03 weight percent, a Gardner color of 3.5 and a viscosity of 1,013 cks. at 130° F. The novel adduct produced in this example, by reacting two polycaprolactone triols of mixed hydroxyl number and a diepoxide in a mole ratio of 2:2:1, yielded a lower viscosity and higher equivalent weight of 163 than any of the control adducts produced by reacting a single polycaprolactone triol and a diepoxide in mole ratios of 4:1 and 2:1. This illustrates that the use of a mixture of polyols will produce an adduct of even lower viscosity and of higher desired equivalent weight than adducts obtained by employing similar overall polycaprolactone polyol to diepoxide ratios using only a single polycaprolactone polyol.

EXAMPLE 2

To a 2-liter, 4-necked flask equipped with stirrer, thermometer and nitrogen inlet tube were charged 450 g. of Polyol A, 540 g. of Polyol B and 274 g. of Polyepoxide A ( a mole ratio of 1.5:1:1, respectively). The temperature of the reaction mass was raised to 100° C. and 0.19 g. (150 ppm) of stannous octoate catalyst was added. The temperature was increased to 150° C. and the reaction was allowed to proceed until the unreacted oxirane was 0.106 weight percent. The adduct of the polycaprolactone triols and diepoxide was a yellow liquid having a hydroxyl number of 333, a Gardner color of about 3.5 and a viscosity of 3,790 cks. at 130° F. The novel adducts produced in this example had an equivalent weight of 168, which was even higher than that of the 2:2:1 adduct of Example 1. While the viscosity was somewhat higher than the 4:1 mole ratio control adducts, the adducts of this Example have both the desired equivalent weight above 150 and viscosity below 5,000 cks. at 130° F., whereas none of the control adducts achieve this combination of properties.

EXAMPLE 3

A white-pigmented two-package polyurethane coating was prepared from the adduct of Example 1 and Polyisocyanate A.

There were charged to a pebble mill 243.92 g. of the adduct of Example 1, 292.74 g. of titanium dioxide, 7.32 g. of soya lecithin as grinding aid and 120.14 g. of ethoxyethyl acetate. The composition was ground and a pigment grind of less than 7 Hegman was produced.

There were charged to a quart container 145.83 g. of the pigment grind produced above, 100 g. of Polyisocyanate A, 0.013 g. of dibutyltin dilaurate, 0.13 g. of Leveling Agent A and 50 g. of ethoxyethyl acetate. This produced a pigmented coating composition having a No. 2 Zahn cup spray viscosity of between 20 to 25 seconds and a total solids content of 65%. It was sprayed onto unprimed steel panels and cured for 10 minutes at a temperature of 302° F. The cured coatings were allowed to stand for seven days at room temperature and physical tests were run. The physical data is summarized in Table III wherein it is compared to the white-pigmented coating of Example 4 and a Control Coating as hereinafter set forth.

EXAMPLE 4

Using a procedure similar to that of Example 3, a white-pigmented coating composition was produced substituting the novel adduct of Example 2 as the polyol adduct component. The following components in the indicated amounts comprised the coating:

| Pigment Grind | Weight, g. |
|---|---|
| Adduct from Example 2 | 83. |
| TiO$_2$ | 94.95 |
| Soya lecithin | 1.9 |
| Ethoxyethyl acetate | 68. |
| Coating Formulation | |
| Polyisocyanate A | 50. |
| Pigment grind | 86.93 |
| Dibutyltin dilaurate | 0.0133 |
| Leveling Agent A | 0.067 |
| Ethoxyethyl acetate | 31. |

The coating was applied to the same metal substrate and in the same manner described in Example 3. Physical properties of the cured coating are given in Table III.

CONTROL COATING A

Table III includes physical data on a control coating prepared from Polyol C. The same methods of production and application were used as described in Examples 3 and 4 with the following formulation. In producing the coating formulation, ethoxyethyl acetate was added in an amount sufficient to give a No. 2 Zahn cup viscosity of 25 seconds.

| Pigment Grind | Weight, g. |
|---|---|
| Polyol C | 1,500. |
| TiO$_2$ | 1,546.5 |
| Soya lecithin | 7.5 |
| Ethoxyethyl acetate | 450. |
| Coating Formulation | |
| Polyisocyanate A | 155.6 |
| Pigment grind | 233.6 |
| Dibutyltin dilaurate | 0.065 |
| Leveling Agent A | 0.1 |

The physical properties of the control coating, measured after a 7-day cure at room temperature, are compared to the compositions of this invention in Table III.

TABLE III

| Example No. of Coating | Control A | 3 | 4 |
|---|---|---|---|
| 20° Gloss | 60 | 70 | 78 |
| Hardness, Sward* | 64 | 50 | 48 |
| Hardness, Pencil | 7H | 4H | 3H |
| Abrasion Resistance, mg. loss | 46.1 | 24.9 | 23.6 |
| Gardner Impact, in.-lb. | | | |
| Face | 120 | 160 | >160 |
| Reverse | 130 | 160 | >160 |
| Spray Solids, %** | 55 | 65 | 60 |

*An average of two values measured in perpendicular directions on the sample.
**At No. 2 Zahn viscosity of 25 seconds.

The data shows that the coating compositions containing adducts of this invention had higher spray solids content than did the control coating. The coating compositions of the novel adducts of this invention have generally superior impact resistance and abrasion resistance and satisfactory hardness and gloss values when compared to the control coating.

EXAMPLE 5

Using a procedure similar to that of Example 3, a green metallic coating was prepared from the adduct of Example 1 using the following composition:

| Pigment Grind | Weight, g. |
|---|---|
| Adduct from Example 1 | 325.22 |
| Phthalocyanine green | 32.56 |
| Carbon black | 1.88 |
| Ethoxyethyl acetate | 160.18 |
| Coating Formulation | |
| Pigment grind | 85.61 |
| Polyisocyanate A | 100. |
| Dibutyltin dilaurate | 0.013 |
| Aluminum powder | 3.07 |
| Leveling Agent A | 0.13 |
| Ethoxyethyl acetate | 61. |

The coating was sprayed onto the same metal substrate and in the same manner as the coating of Example 3. Physical properties of the cured coating appear in Table IV.

EXAMPLE 6

Using a procedure similar to that of Example 3, a green metallic coating was prepared from the adduct of Example 2 using the following composition:

| Pigment Grind | Weight, g. |
|---|---|
| Adduct from Example 2 | 166. |
| Phthalocyanine green | 15.8 |
| Carbon black | 0.91 |
| Soya lecithin | 0.33 |
| Ethoxyethyl acetate | 71.1 |
| Coating Formulation | |

-continued

| Pigment grind | 66.86 |
|---|---|
| Polyisocyanate A | 75. |
| Dibutyltin dilaurate | 0.02 |
| Aluminum powder | 1.04 |
| Leveling Agent A | 0.099 |
| Ethoxyethyl acetate | 46. |

The coating was sprayed onto the same metal substrate strate and in the same manner as the coating of Example 3. Physical properties of the cured coating appear in Table IV.

CONTROL COATING B

A green metallic coating was prepared using Polyol C by a procedure similar to that of Example 3. In producing the coating formulation, ethoxyethyl acetate was added in an amount sufficient to give No. 2 Zahn cup viscosity of 25 seconds.

| Pigment Grind | Weight, g. |
|---|---|
| Polyol C | 1,500. |
| Phthalocyanine green | 131.25 |
| Carbon black | 7.58 |
| Ethoxyethyl acetate | 125. |
| Coating Formulation | |
| Pigment grind | 117.6 |
| Polyisocyanate A | 155.6 |
| Dibutyltin dilaurate | 0.065 |
| Aluminum powder | 5. |
| Leveling Agent A | 0.1 |

The coating was sprayed onto the same metal substrate and in the same manner as the coating of Example 3. Physical properties of the coating are given in Table IV.

TABLE IV

| Example No. of Coating | Control B | 5 | 6 |
|---|---|---|---|
| 20° Gloss | 73 | 81 | 83 |
| Hardness, Sward* | 56 | 68 | 56 |
| Hardness, Pencil | 2H | H | 3H |
| Abrasion Resistance, mg. loss | 26.8 | 9.5 | 14.9 |
| Gardner Impact, in.-lb. | | | |
| Face | 40 | 100 | 160 |
| Reverse | 10 | 100 | 125 |

TABLE IV-continued

| Example No. of Coating | Control B | 5 | 6 |
|---|---|---|---|
| Spray Solids, %** | 50 | 55 | 56 |

*An average of two values taken in perpendicular directions on the sample.
**At No. 2 Zahn cup viscosity of 25 seconds.

The data further illustrates that the novel adducts of the present invention are suitable for use in producing metallic coatings having a good balance of physical properties. When compared to the control coating, they exhibited superior impact resistance, higher gloss, higher total solids content and comparable hardness.

What is claimed is:

1. An adduct of a polycaprolactone polyol and a cycloaliphatic diepoxide comprising the reaction product of (a) at least two polycaprolactone polyols differing in average hydroxyl number by an amount from 250 to 400 and having average hydroxyl numbers from about 180 to about 600 and (b) a cycloaliphatic diepoxide, said adduct having a viscosity of less than 5,000 cks. at 130° F. and an equivalent weight of at least 150.

2. An adduct as claimed in claim 1, wherein the mole ratio of polycaprolactone polyols to cycloaliphatic diepoxide is from 2.5:1 to 4:1.

3. An adduct as claimed in claim 1 wherein the mole ratio of the two polycaprolactone polyols to the cycloaliphatic diepoxide is 2:2:1, respectively.

4. An adduct as claimed in claim 1 wherein the mole ratio of the two polycaprolactone polyols to the cycloaliphatic diepoxide is 1.5:1:1, respectively.

5. An adduct as claimed in claim 1 wherein the difference in average hydroxyl numbers between said polycaprolactone polyols is from 250 to 350.

6. An adduct as claimed in claim 1 wherein said cycloaliphatic diepoxide has the structure:

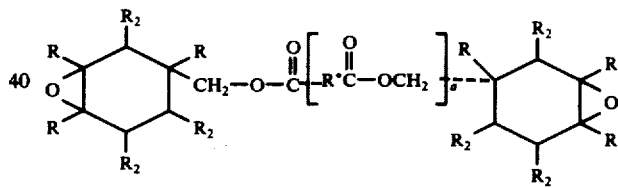

wherein R is hydrogen or alkyl of 1 to 4 carbon atoms; R* is a valence bond or a hydrocarbon radical having from 1 to 5 carbon atoms: and $a$ is zero or one.

* * * * *